Oct. 8, 1929.  I. STERN  1,730,542

DENTURE ATTACHMENT

Filed Nov. 26, 1926

INVENTOR
ISIDORE STERN
BY
Bohleber & Ledbetter
ATTORNEYS

Patented Oct. 8, 1929

1,730,542

UNITED STATES PATENT OFFICE

ISIDORE STERN, OF NEW ROCHELLE, NEW YORK

DENTURE ATTACHMENT

Application filed November 26, 1926. Serial No. 150,669.

This invention relates broadly to dentistry and more particularly to improvements in adjustable denture attachments for use in connection with removable bridgework.

The bridgework to which the present invention relates involves primarily a removable bridge adapted to be disposed between two natural teeth referred to as pier teeth in the dental art, and having a denture attachment or support at either end adapted to be removably secured within a socket or recess in a pier tooth. The denture attachment or support is secured within the socket by adjustable and/or resilient means which takes up any wear occasioned by use or service of the bridgework and is capable of adjustment to compensate for such wear.

Each adjustable denture attachment preferably comprises generally two parts, to wit, a support proper which includes a shank formed on or secured to the removable bridgework or bridge and a head unitary therewith upon which a resilient and/or adjustable securing means is carried for retention in the pier tooth socket.

An object of the present invention is the provision of adjustable securing means for the head within the pier tooth socket which shall be disposed in the lower portion of the socket when the dental bridge is in proper position on the gums and which shall be rigidly and mechanically anchored to the support in such manner that the anchorage will not be weakened by any reduction in the quantity of material in the upper portion of the support by the dentist in cutting away the denture attachment to conform to the occlusal surface of the teeth. According to the invention the adjustable securing means is resilient and preferably takes the form of a leaf spring or flexible plate disposed in what is, in effect, a vertically directed groove in the lower portion of the head, the leaf spring having an enlarged anchoring portion which may be called an anchoring bar disposed in a plane transverse to the general vertical axis of the support when in operative position and extending into a receiving space formed in the support.

More particularly the head is divided into two independent portions, spaced from one another a distance sufficient to receive, as in a slot, the anchoring bar on the spring with the outer surfaces of the bar flush with the marginal surfaces of the head, while the shank is cut away to form a recess in register with the slot or receiving space to receive a projection called a locking lug formed on the anchor bar.

Another object of the invention is the provision of a denture attachment which shall be practical from the standpoint of ease and simplicity of manufacture and facility in use.

These and other objects of the invention and the means for their attainment will be more apparent from the following detailed description taken in connection with the accompanying drawings illustrating a preferred embodiment of the invention, in which, Figure 1 is a general view in perspective showing bridge-work mounted between spaced natural teeth by means of the adjustable denture attachment forming the subject matter of the present invention to show the use of the invention.

Figure 1:
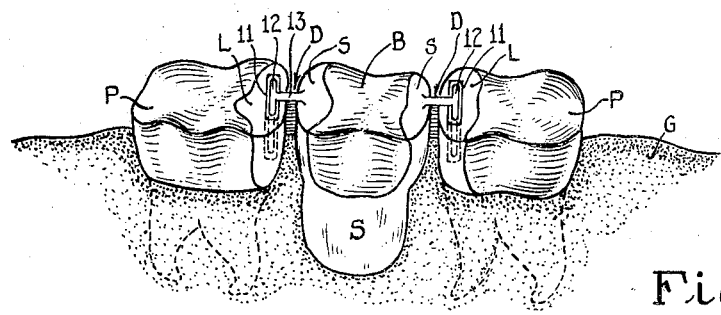
Figure 2:
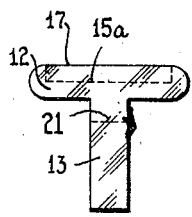
Figures 2, 3 and 4 are views showing the support of the denture attachment, i. e. with the resilient adjustable member removed, looking from above, from the rear, and in side elevation, respectively.
Figure 3:
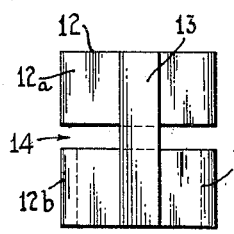
Figure 4:
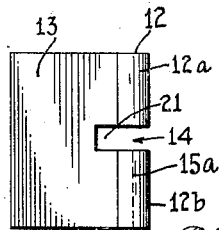
Figure 5:
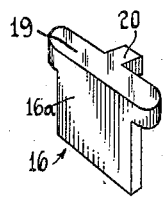
Figure 5 is a view in perspective showing separately the resilient adjustable member to be built into the support to form an adjustable denture attachment.
Figure 6:
Figure 6 is a view of the completed denture attachment looking from above and showing the spring means and head in assembled relation.
Figure 7:
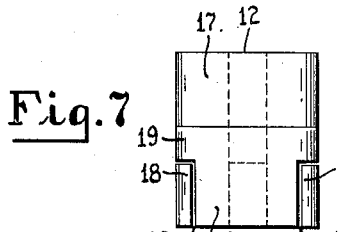
Figure 7 is a front view of the denture attachment showing the adjustable spring in position.

Referring to Figure 1 for a general understanding of a removable bridge, there is shown spaced natural pier teeth P usually remaining in the gum G of the patient. A bridge B is mounted between the pier teeth P and includes a gold saddle S of any suitable form and which saddle provides an anchorage for a denture attachment D and carries the bridge tooth or teeth B as well. The pier teeth are usually fitted with metallic or gold inlays L in which is embedded a socket receptacle 11 to receive a head 12 integrally included on the anchorage shank 13 of the attachment. The bridge B is removed by lifting it vertically out of its supporting sockets 11, and after suitable adjustment of its spring or springs by a tool or other means, it is replaced and will then positively maintain its fixed position by reason of the adjustment or spread open position of the spring in relation to the denture head 12.

Referring now more particularly to the denture attachment itself in all the other views, a head 12 is provided with spring adjustable securing means 16 whereby when the denture attachment, indicated as a whole at D, is set into a pier tooth socket 11 it will be retained therein and the bridge B supported on the natural teeth. The adjustable resilient means 16 preferably is a spring, such as a plate or, say, a leaf spring, which is adjustable to press against the walls of the recess and retain the denture attachment D against accidental displacement.

Figure 10:
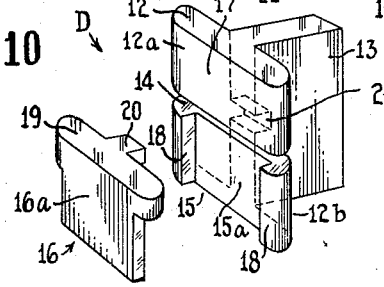
Figure 10 is a disassembled view in perspective showing the denture attachment parts.

Figure 10 shows the denture attachment or support D in upright position, but with the adjustable spring member distanced from its seat on the support and for convenience the various portions of the attachment will be referred to as the top, bottom, side and the like substantially as viewed in that figure.

Between the ends the head 12 is cut transversely for the full thickness thereof so that there is formed, in effect, two separate head portions, an upper one 12$^a$ and a lower one 12$^b$ which are spaced from one another by a slot 14. The lower head portion 12$^a$ is formed with what may be termed a vertically extending recess or groove 15 to receive the adjustable resilient member 16.

This groove 15 or the bottom thereof may be considered as a surface 15$^a$ of the head 12 offset with respect to the surface 17 on the upper portion 12$^a$ of the head although preferably but not necessarily lying in parallel planes. And the groove 15 may be considered as defined by walls or flanges 18 along the sides of the lower head portion 12$^b$.

In the illustrated embodiment, the adjustable resilient means 16 takes the form of a flat resilient plate or leaf spring 16 adapted to lie flexibly in the groove 15, that is, to be juxtaposed to the surface 15$^a$ between the flanges 18. It is secured within the groove by an anchoring bar 19 as an enlarged portion formed on or carried with the spring 16 of the general cross-sectional form of the head 12 and lying within a cut out portion or slot 14 so as to continue the marginal surfaces of the head portion 12$^a$.

Figures 8, 9:
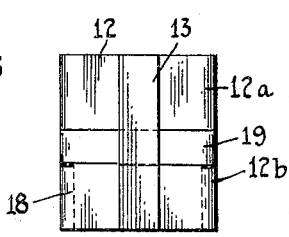
Figure 8 is a longitudinal sectional view on the line 8—8 of Figure 6 showing particularly the adjustment of the spring in dotted lines.
Figure 9 is a rear view of the denture attachment.

The outer surface 16$^a$ of the spring may be flush with the outer surface of the anchorage bar 19 and the surface of the flanges 18 so that, when assembled, all the marginal surfaces will be substantially continuous although it must be understood that when the denture attachment is to be used the plate or leaf may be deflected outwardly as shown in dotted lines in Figure 8 to yieldingly engage the walls of the recess or socket 11 in the pier tooth and retain the support removably therewithin.

The anchoring bar 19 is permanently seated in the slot 14 and soldered or otherwise secured therein, and thus the spring 16 completes the structure of the head 12. Also, it is proposed to further secure the spring 16 on the head 12 by the formation on the anchorage bar of a locking lug 20 which projects into a notch or recess 21 formed in the shank 13. This recess is, in effect, a groove of the same width as the slot 14 in the head and extends from the head 12 back into the shank 13. If desired, the lug 20 may be somewhat wider than the width of the shank 13 so that upon assembly the ends may be upset to press the lug within the notch 21 and cause it to be securely held therein, or it may be soldered in the shank notch 21. The transverse dimension of spring 16 is slightly less than the width of the groove 15 between the walls 18 to afford a clearance 22 at each side and permit free flexing of the spring, and the edges of the spring 16 are protected by the flanges or ribs 18.

To adjust the tension of the spring 16 a tool or other sharp instrument may be inserted from below between the spring 16 and the head 12 to deflect the spring outwardly a distance at the lower end sufficient to cause it to yieldingly engage the wall of the socket 11 in the pier tooth P when inserted therein and thus make it removably hold the support D against displacement.

By the construction described the flexible portion of the spring 16 is disposed in the lowermost portion of the pier tooth socket 11. The spring is rigidly anchored to the support D without recourse to additional fastening elements or, necessarily, solder while substantially the upper half of the support D is not required as a securing surface for the spring and hence may be cut away, i. e. the denture head 12 may be shortened as much as necessary to conform to the occlusal surface of the pier tooth without detriment to the adjustable means or impairing the action of the spring.

The semi-cylindrical edges of the head on which the spring is assembled, together with the semi-cylindrical edges on the anchor bar, form a continuous head thereby contributing to the facility with which the support D may be inserted in and withdrawn from the socket, and the delicate spring is protected by the ribs 18.

Various modifications may be made in the construction of the adjustable attachment without departing from the spirit and scope of the invention as set forth in the appended claims.

What I claim is:

1. A denture attachment for removable bridgework comprising a support formed with a transversely extending slot and a recess on one side of the slot, and a retaining member having a portion extending into the slot and a resilient portion in the recess.

2. A denture attachment for removable bridgework comprising a support having a head formed with a transversely extending slot and a vertically extending groove on one side of the slot, and a retaining member having a portion retained within the slot and a resilient portion extending into the groove.

3. A denture attachment for removable bridgework comprising a support having a head formed with a transversely extending receiving space and a vertically extending groove on one side of the space and a shank formed with a recess, a retaining member having a portion retained within the receiving space, a projection extending into the recess and a resilient portion extending in the groove.

4. A denture attachment for removable bridgework comprising a support including a shank and a head comprising two spaced portions, one of said portions being formed with a recess extending in the vertical direction of the shank, said shank being formed with a recess between the head portions, an anchor bar between the head portions whereof the marginal surfaces coincide with the marginal surfaces of the head, a lug carried with the anchor bar to enter the second named recess and a resilient element carried with the anchor bar in the first named recess.

5. A denture attachment for removable bridgework comprising a T-shaped support whereof the head is adapted to be received in a pier tooth socket and the shank is adapted to be secured to a dental bridge, said head being formed with a transverse cut out portion between its ends and a longitudinal groove extending from the cut out portion to the lower edge, said shank being formed with a cut out portion in register with the cut out portion of the head, an adjustable resilient leaf in the groove, an anchor bar carried with the leaf to lie in the cut out portion of the head and a locking lug carried with the anchor bar to enter the cut out portion in the shank, the edges of the head and anchor bar being continuous and substantially semi-cylindrical.

6. A denture attachment including a support having spaced portions whereof corresponding faces lie in offset planes, adjustable means adjacent one of the faces and an enlarged member carried with the adjustable means and disposed between the spaced portions.

7. A denture attachment including a support having spaced portions whereof corresponding faces lie in offset planes, an adjustable member adjacent one of the faces and lying flush with the other face and an enlarged member carried with the adjustable member disposed between the spaced portions.

8. A denture attachment including a support having spaced portions whereof one pair of corresponding faces lie in offset planes, an adjustable resilient plate adjacent one of the faces and lying substantially flush with the other face and an enlarged member carried with the adjustable plate and anchored between the spaced portions.

9. A denture attachment including a support having spaced portions whereof corresponding faces lie in offset planes, adjustable means adjacent one face, anchoring means carried with the adjustable means and disposed between the spaced portions and means to prevent displacement of the adjustable member.

10. A denture attachment including a support having spaced portions whereof one pair of corresponding faces lie in offset planes, an adjustable resilient plate adjacent one of the faces and lying flush with the other face, and an anchor bar carried with the adjustable plate disposed between the spaced portions and means to prevent displacement of the adjustable member.

11. A denture attachment including a head having a lower and an upper vertically spaced portion whereof respective corresponding faces lie in offset planes, adjustable means proximate one of the faces and means to prevent displacement of the adjustable means.

12. A denture attachment including a head having a lower and an upper vertically spaced portion whereof respective corresponding faces lie in offset planes, adjustable means proximate one of said faces and means to prevent displacement of the adjustable means in a vertical plane.

13. A denture attachment including a head having a lower and an upper vertically spaced portion whereof respective corresponding faces lie in offset planes, one of said portions serving as a fixed guide, adjustable means proximate one of the faces and means to prevent displacement of the adjustable means in a transverse direction.

14. A denture attachment including a head having a lower and an upper vertically spaced portion whereof respective corresponding faces lie in offset planes, the upper portion being a fixed guide, adjustable means proximate one of the faces and means to prevent displacement of the adjustable means in vertical and horizontal directions.

15. A denture attachment for removable bridge-work comprising a support having a pier tooth socket engaging portion formed with a lower and an upper vertically spaced offset surface, a socket engaging member proximate one surface and securing means for the member in the space between the surfaces.

16. A denture attachment for removable bridge-work comprising a support having a pier tooth socket engaging portion formed with spaced surfaces in offset parallel planes, a socket engaging leaf proximate one surface and flush with the other surface and securing means for the leaf in the space between the surfaces and continuing the outer marginal surfaces of the socket engaging portion.

17. A denture attachment for removable bridge-work comprising a support having a pier tooth socket engaging portion formed with offset surfaces, a socket engaging member proximate one surface and securing means for the member, the surface to which said member is proximate being formed with flanges along its edges to confine the securing means.

18. A denture attachment for removable bridge-work comprising a support having a pier tooth socket engaging portion formed with a transverse slot and a groove on one side of the slot, a resilient plate in the groove, an anchoring member carried with the plate and entering the slot and means to secure the anchoring member within the slot.

In testimony whereof I affix my signature.

ISIDORE STERN.